United States Patent

[11] 3,626,395

[72] Inventor Virgilio J. Quiogue
Plymouth, Mich.

[21] Appl. No. 35,040
[22] Filed May 6, 1970
[45] Patented Dec. 7, 1971
[73] Assignee Burroughs Corporation
Detroit, Mich.

[54] DUAL CLOCKING RECORDING AND REPRODUCING SYSTEM FOR MAGNETIC DATA
8 Claims, 43 Drawing Figs.

[52] U.S. Cl. .................................................. 340/174.1 G, 340/174.1 H, 346/74 M
[51] Int. Cl. .................................................. G11b 5/02, G06k 7/00
[50] Field of Search .................................................. 340/174.1 A, 174.1 G, 174.1 H; 346/74 M

[56] References Cited

UNITED STATES PATENTS

| | | | |
|---|---|---|---|
| 3,237,176 | 2/1966 | Jenkins.......................... | 340/174.1 G |
| 3,299,414 | 1/1967 | Sims, Jr. .......................... | 340/174.1 G |

*Primary Examiner*—Bernard Konick
*Assistant Examiner*—J. Russell Goudeau
*Attorneys*—Kenneth L. Miller and Edwin W. Uren

ABSTRACT: A method and apparatus for magnetically processing digital binary information in an electronic computer on a magnetically coated disc. A dual clocking system is provided for synchronizing the information from each circular track into the main clocking system of the computer. The method looks ahead to the next succeeding binary bit to determine the frequency of flux reversals on the disc.

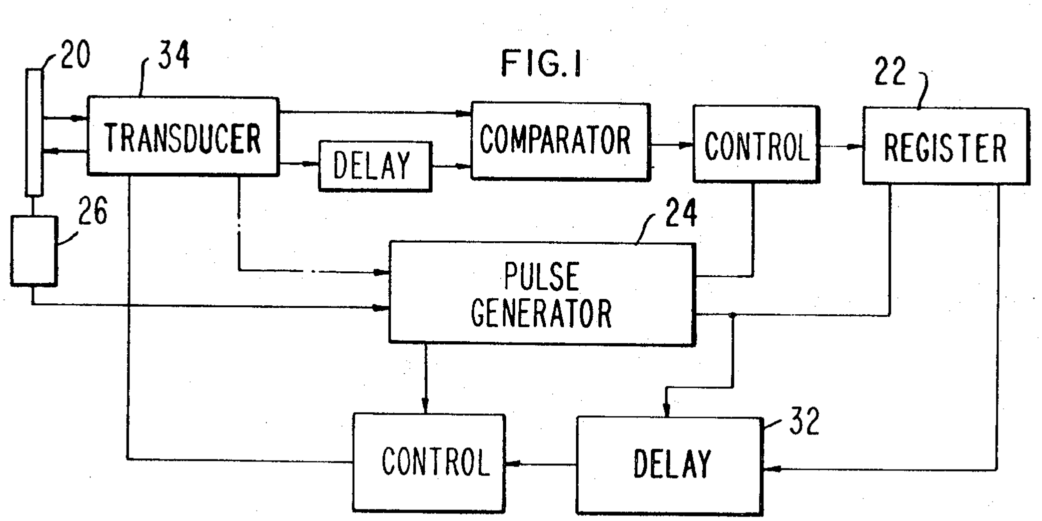
FIG.1
FIG.2
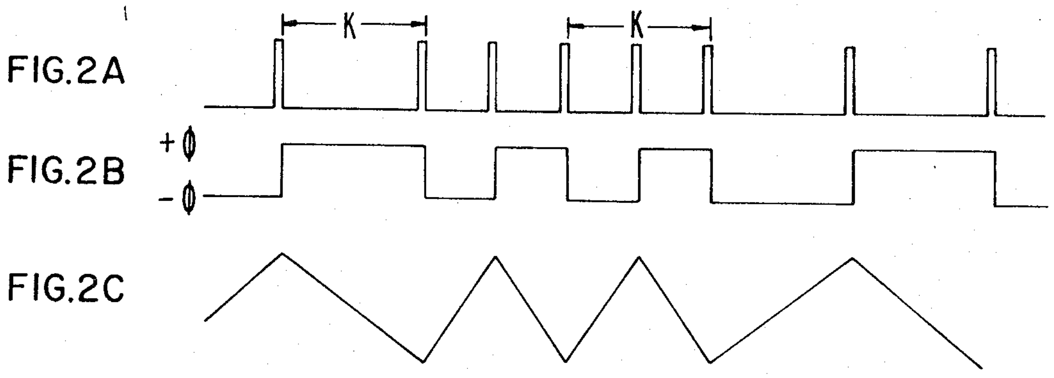
FIG.2A FIG.2B FIG.2C
FIG.3
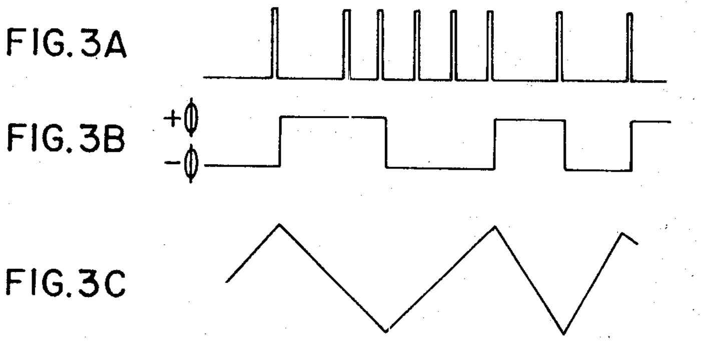
FIG.3A FIG.3B FIG.3C
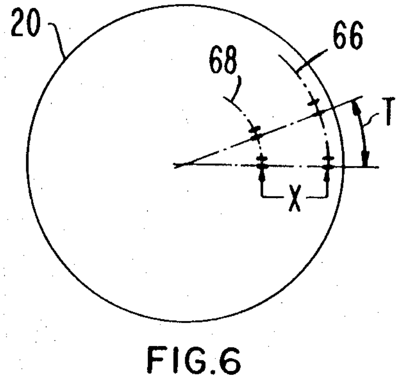
FIG.6
INVENTOR.
VIRGILIO J. QUIOGUE
BY Russel C. Wells
ATTORNEY FIG. 4
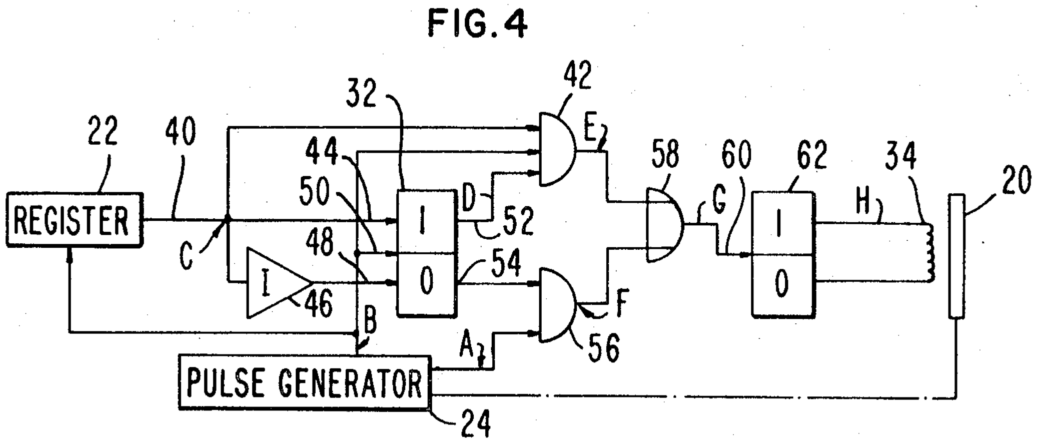
FIG. 5
FIG. 5A, FIG. 5B, FIG. 5C, FIG. 5D, FIG. 5E, FIG. 5F, FIG. 5G, FIG. 5H, FIG. 5J
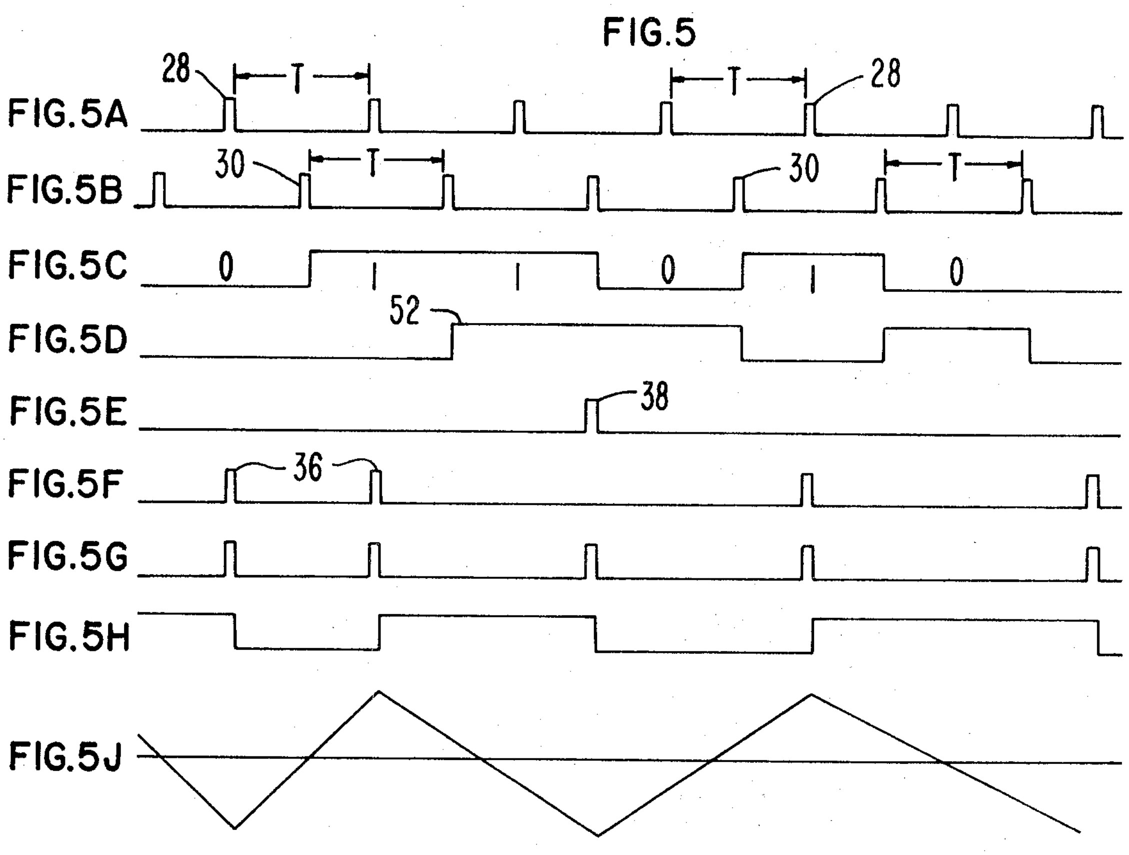

FIG. 7
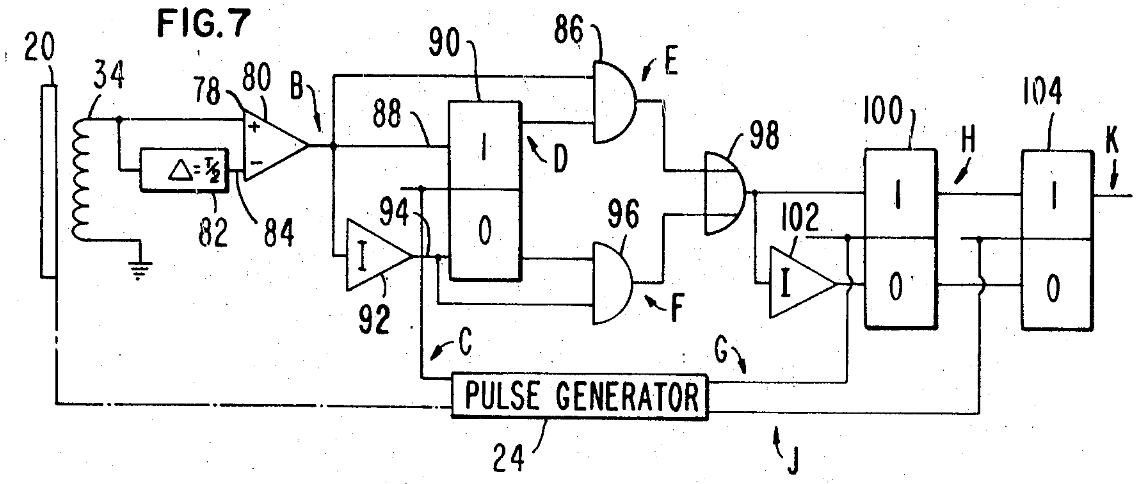
FIG. 8
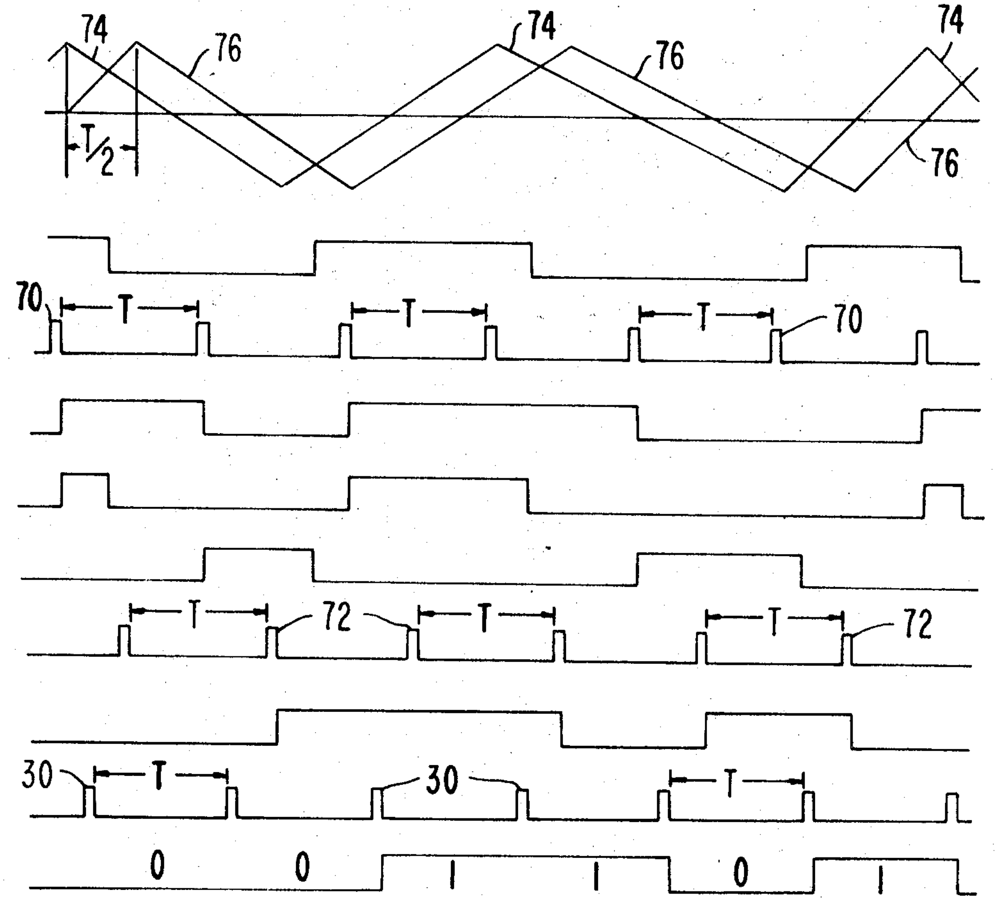
FIG. 8A, FIG. 8B, FIG. 8C, FIG. 8D, FIG. 8E, FIG. 8F, FIG. 8G, FIG. 8H, FIG. 8J, FIG. 8K

DUAL CLOCKING RECORDING AND REPRODUCING SYSTEM FOR MAGNETIC DATA

FIELD OF THE INVENTION

This invention relates to the processing of information in an electrical communication system and more particularly to a method and apparatus for optimum recording bit density of information on a rotating magnetic disc.

SUMMARY OF THE INVENTION

In an information storage system such as is found in an electronic computer having a magnetically coated memory member, an information processing system for processing information from some form of input-output device to the memory. A register for receiving and temporarily storing digital binary valued information from the input-output device is operatively connected to a pulse generator. The pulse generator is responsive to a timing track on the magnetic disc for generating a first series of pulses having a pulse repetition rate equal to T and additionally generates a second series of pulses interposed respectively in the space between adjacent pulses of said first series of pulses. A binary storage means is operatively coupled in succession to each stage of the register to temporarily store each binary digit in response to a pulse from said second series of pulses. A first logical gate is responsive to the electrical signals from said register, from the one output of said binary storage means and said second series of pulses to generate a first recording signal when adjacent stages of said register have binary one value digital signals. A second logical gating means is responsive to the binary zero output of said binary storage means and to said first series of pulses to generate a second recording signal for each binary zero value digital signal from the register. Both the first and second recording signals are combined at a magnetic transducer to control the magnetic energizing of adjacent elements on the magnetic coated memory.

DESCRIPTION OF DRAWINGS

In the drawings:

FIG. 1 is a schematic block diagram of an information processing system according to this invention;

FIG. 2A–2C are illustrations of prior art magnetic recording techniques;

FIG. 3A–3C are illustrations of the magnetic recording technique according to this invention;

FIG. 4 is a schematic block diagram of an information-processing system;

FIG. 5A–5J are waveform illustrations taken at corresponding lettered positions in FIG. 4;

FIG. 6 is a graphic illustration of adjacent magnetic pulses on concentric tracks of a magnetic disk;

FIG. 7 is a schematic block diagram of an information-processing system;

FIG. 8A–8K are waveforms illustrations taken at corresponding lettered positions in FIG. 7;

DETAILED DESCRIPTION

Figure 9:
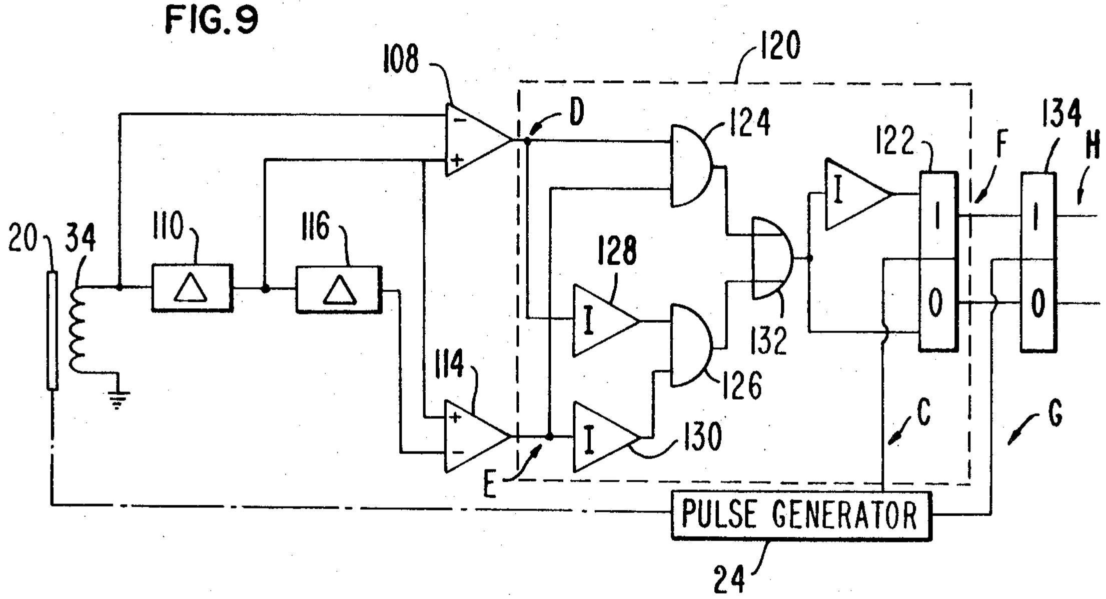
FIG. 9 is a schematic block diagram of another embodiment of the information-processing system of FIG. 7.

Referring to the Figures by the characters of reference, there is shown in FIG. 1 a system for processing information for optimum storage density on a recording medium 20. In the preferred embodiment, the system comprises a magnetic recording surface 20 wherein information is digitally recorded according to its binary value. Optimum information storage density on the recording medium in magnetic recording is accomplished by a next-bit dependent method of recording wherein the number of flux reversals per unit of length on the record medium, depends upon the characteristics of the information bit being presently recorded and the next information bit to be recorded.

In the next-bit dependent method of recording, the information to be recorded is stored in a register 22 or other similar storage means in digital binary value bit form and is removed from the register and in bit serial form. A pulse generator 24 generates a plurality of clock or sampling signals having a frequency which is equal to twice the recording frequency of the recording medium. In the preferred embodiment, the recording medium 20 is a rotating magnetic disk and the pulse generator 24 is responsive thereto. Located upon the disk 20 is a continuous circular timing track having a plurality of equally spaced flux reversals. A transducer 26 is responsive to each flux reversal and is operatively coupled between the disk 20 and the pulse generator 24 for generating a pulse 28 coincident with each flux reversal on the timing track. In response to each signal generated by the transducer 26 from the timing track, the pulse generator 24 generates a second signal 30 interposed in the space between adjacent pulses 28 from the timing track. Therefore, in effect the output of the pulse generator 24 is a sampling signal having a frequency equal to twice the recording bit frequency of the magnetic disk.

The register 22 is sampled at every odd-numbered-sampling signal 30 from the pulse generator 24 and the information stored in the register, at that time is removed therefrom and temporarily stored in a delay means 32. If the information stored in register 22 is zero then at the next succeeding even-numbered-sampling signal 28 the output of the delay means 32 is gated with the sampling signal 28 generating a first signal 36, illustrated in FIG. 5F, which is applied to the transducer 34 and a flux reversal is recorded on the recording medium 20. At the next succeeding odd-numbered-sampling signal pulse 30, the output of the delay means 32 and the output of the register 22 are compared and if found equal, a second signal 38, shown in FIG. 5E, is generated and applied to the transducer 34 for recording a flux reversal on the recording medium 20. This second signal 38 is generated only when the present bit of information to be stored is a one and the next succeeding bit of information to be stored is also a one.

Referring to FIG. 2, there is shown a graphic representation of a typical phase-recording system wherein a flux reversal is made at the beginning of each data cell time illustrated by the reference character K. If within a data cell time, the value of the information is a one, a flux reversal is made intermediate the ends of the data cell time. FIG. 2A is a representation of a serial pulse pattern of the number 6 as represented in a four bit binary pulse code. FIG. 2B is an idealized representation of the flux reversals on a magnetic recording medium for the information of FIG. 2A. The two levels of the pulses of FIG. 2B, represents the plus flux $+\Phi$ and the minus flux $-\Phi$ recording levels. FIG. 2C is a representation of the waveform which a transducer would produce in response to the change of flux, illustrated in FIG. 2B. For ease of representation the waveform has been illustrated as basically a sawtooth, although it is to be understood that the waveshape due to the magnetic characteristics of a system, would approximate a sinusoidal wave. From FIG. 2B the recording bandwidth is defined as one:two. That is, the frequency of recording is at two frequencies, the second frequency being twice the first.

FIG. 3A represents the serial pulse train of the same number 6 in binary pulse form. The difference between FIGS. 3A and 2A is that the frequency of 3A is twice that of FIG. 2A. In a similar manner, FIG. 3B represents the flux reversals on the magnetic recording medium according to the present invention in response to the information of FIG. 3A. Likewise, FIG. 3C represents the pulse waveform which is generated by a transducer in response to the flux pattern of FIG. 3B. The recording bandwidth of the signal of FIG. 3B is identical to the bandwidth of FIG. 2B, namely, the one:two. In both FIGS. 3B and 2B, the frequencies are the same, however, the amount of information recorded within a given physical length or distance on the recording medium is different. The information density of the system as shown in FIG. 3 is twice that of the system shown in FIG. 2.

The next-bit dependent method of recording data information is defined by the following basic rules. First, if the information bit to be recorded is zero, there is a flux change at the beginning of each data cell or in terms of the output of the pulse generator at every even-numbered-sampling signal. Second, if the present bit to be recorded is a binary one bit valued signal, there is a flux change at a point intermediate the ends of a data cell if the next bit to be recorded is also a one. Third, if the present bit to be recorded is a one and the next bit to be recorded is a zero, there is no flux change for that data cell. These rules are shown in a diagrammatic fashion in FIGS. 3A, 3B and 3C.

FIG. 4 is a schematic of a preferred embodiment of the means for recording data information on a magnetic recording medium 20 according to the present invention. The information to be recorded is stored in a register 22 which in the preferred embodiment comprises a plurality of flip-flops. The flip-flops are electrically connected in the form of a shift register wherein the signal output of the register 22 appears at the same output flip-flop 40 each and every time. The input to the register is adapted to receive information in parallel to each flip-flop. Each flip-flop comprises and contains one binary bit of information of the character to be recorded. As an example, in the decimal to binary conversion of data information such as found in accounting equipment, the binary value of the decimal digit is represented by at least four binary flip-flops. The register 22 would then contain at least four flip-flops each connected in series one to the other and may be adapted to receive information into each stage in parallel.

The electrical output signal shown in FIG. 5C, of the register is electrically connected to a first AND-gate 42, to the J input terminal 44 of a JK flip-flop or delay means 32, and to an inverter 46. The output of the inverter 46 is connected to the K input terminal 48 of the flip-flop. One output of the pulse generator 24, which is the odd-numbered-sampling signal or as will hereinafter be referred to as B' pulse 30, is connected to the register 22 to initiate the shifting of information between flip-flops, the first AND-gate 42 and the triggering input 50 of the flip-flop 32. The true or one output electrical signal 52, shown in FIG. 5D, of the flip-flop 32 is connected to the third input of the first AND-gate 42 and the false or zero output electrical signal 54 of the flip-flop 32 is connected to a second AND-gate 56. The second input to the second AND-gate is connected to receive another output from the pulse generator 24, namely, the even-numbered-sampling signal as will hereinafter be referred to as the A' pulse 28 which is directly responsive to the flux reversals on the clock or timing track of the magnetic recording medium in the manner as previous explained. The output signals of both the AND-gates 42 and 56 are combined together in an OR-gate 58 having its output shown in FIG. 5G connected to the clocking or triggering input 60 of a second flip-flop 62. An electromagnetic transducer 34 is operatively connected across both output terminals of the second flip-flop 62 and is responsive to the signals from the OR-gate 58. The output stages of each output terminal of the second flip-flop 62 have sufficient power capabilities to saturate the electromagnetic transducer 34.

FIG. 5 is a timing diagram of the circuit of FIG. 4 and will be used in conjunction with the explanation of FIG. 4. The letter attached to each Figure number represents the corresponding reference point in FIG. 4. FIG. 5A illustrates the voltage pulse waveform for the A' pulses 28 from the pulse generator 24. FIG. 5B illustrates the voltage pulse waveform for the B' pulses 30 from the pulse generator. FIG. 5C is a representation of the data in register and for the purposes of illustration represents the following binary information, 011010. FIG. 5D illustrates the output of the true or one side 52 of the first flip-flop 32 of FIG. 4. FIG. 5E represents the output waveform of the first AND-gate 42 whenever there are two adjacent binary one valued bits in the register. FIG. 5F is the output voltage waveform from the second AND-gate 56 and indicates each binary-valued zero bit in the register. FIG. 5G is the pulse waveform output of the OR-gate 58 and is a summation of the pulses at the points E and F of FIG. 4. FIG. 5H is indicative of the state of flux on the magnetic recording medium. FIG. 5J is a graphic representation of the output of an electromagnetic transducer which would be responsive to the recording of the information in FIG. 5H.

As previously mentioned, the first series of pulses, the A' pulses 28, are generated in response to a clock or timing track on the magnetic recording medium and have a time between pulses equal to T which is shown in FIG. 5A. The second series of pulses, the B' pulses 30, also have a time between adjacent pulses equal to T and are interposed in the space between adjacent pulses from said first series of pulses. The first pulse shown on FIG. 5B controls the loading of the information from the register 22 into the delay means or first flip-flop 32. If the information in the register 22 is a binary one bit, the input to the one side 44 of the flip-flop 32 is true, however, if the information is a binary zero bit, the signal is inverted and applied to the input 48 to the zero side of the flip-flop 32. It is to be understood that both of the aforementioned inputs cannot be true at the same time. As shown in the timing diagram, on the trailing edge of the B' pulses the flip-flop 32 will switch in response to one of the input signals. When the information is placed into the first flip-flop, the clocking pulses also shift the register one stage. Since in the example shown, the information is zero, the zero output of the flip-flop 32 is True.

At the next A' pulse 28, with the zero output true, the output of the second AND-gate 56 generates a pulse as shown in FIG. 5F. This pulse is applied through the OR-gate 58 to the second flip-flop 62 which complements that flip-flop as shown in FIG. 5H. This change of direction will result in a voltage peak during the read back of the signal from the magnetic storage medium by the transducer as illustrated in FIG. 5J.

After the next B' pulse, the output of the register 22 becomes equal to binary one which signal is clocked into the first flip-flop 32 on the third B' pulse as shown in FIG. 5D. This third pulse also shifts the register one more stage and according to the illustration its output remains at binary one. However, during this second B' pulse the output of the register is binary zero and the first flip-flop 32 remains at zero. The next succeeding A' pulse 28 generates a second output from the second AND-gate 56 as shown in FIG. 5F. Since as previously explained the output of the register at this time is a binary one, the third A' pulse does not enable the second AND-gate 56. At this time the output of the OR-gate 58 at point G is still low and the second flip-flop 62 does not switch, therefore, no flux reversal is made on the magnetic recording medium at this time.

At the fourth B' pulse, the output of the first flip-flop 32 at point D is true and the output of the register is true, therefore, the first AND-gate 42 is enabled and a pulse is generated at point E. This pulse 38 is operatively coupled through the OR-gate 58 to the second flip-flop 62 causing that flip-flop to switch and the flux reversal is recorded on the magnetic recording medium. At the next succeeding or fourth A' pulse, the output of the first flip-flop 32 is in its binary one stage, therefore, the second AND-gate 56 is not enabled and there is no flux reversal coincident with the fourth A' pulse.

At the next succeeding B' pulse, which is the fifth B' pulse, the output of the register 22 as shown in FIG. 5C is equal to zero, therefore, the output of the second AND-gate 56 is not enabled and the output of the OR-gate 58 likewise is not enabled. Since the output of the register is equal to binary zero, the first flip-flop 32 is switched from its one to its zero state. The next or fifth A' pulse will then generate an output from the second AND-gate 56 which will cause the second flip-flop 62 to switch and a flux reversal to be made.

At the next or sixth B' signal, the output of the first flip-flop 32 is equal to binary zero and the first AND-gate is not enabled. Since the information is at zero, at the seventh A' pulse the second AND-gate is enabled causing the second flip-flop 62 to switch and a flux reversal to be made on the recording medium.

As previously mentioned, FIG. 5J is representation of the waveform which an electromagnetic transducer would generate in response to the flux pattern on FIG. 5H. This waveshape will be used in subsequent Figures.

Referring to FIG. 6, there is shown a graphic representation of the recording on two concentric tracks of the magnetic disk 20. The outermost track 66 as hereinbefore described is a timing track and the innermost track 68 is one of a plurality of data information storage tracks. To aid in the graphic representation, the flux reversals on each track are represented by a short heavy line. The angular spacing between adjacent flux reversals on both tracks is equal in the time dimension but is unequal in the physical distance dimension. The innermost track, the physical distance between adjacent flux reversals is much less than that of the outermost track. As shown in FIG. 6, the time between adjacent flux reversals is equal to T. The flux reversals in the outermost or timing track 66 are prerecorded on the disk and function as a reference point in the recording of information in any of the other tracks.

In FIG. 6, there is shown four groups each of two representations of flux reversals. In each group the second flux reversal is spaced a distance "X" from the first flux reversal. If every component connected with the recording of magnetic information were ideal, a flux reversal would occur at the first line of each group. However, several factors within the system, namely, the physical gap of the electromagnetic transducer, the inductance of the electromagnetic transducer which effects the buildup of current in the transducer during recording and the different rise times in electrical characteristics of each transducer cause the actual flux reversal to occur at some distance "X" from the ideal flux reversal. In FIG. 6, the letter X is used to represent the physical distance between the ideal flux reversal and the actual flux reversal. It is to be understood that this distance is not necessarily equal between tracks but for the purposes of explanation we will consider that each electromagnetic transducer is identical. Since the distance "X" is equal in both the represented tracks, the actual time dimension is different. It is obvious that if one draws a radian, which is a constant line, from the center of the disk to the outwardmost track intercepting the flux reversal on the innermost track, the second flux reversal of the timing track occurs at a earlier time.

In the magnetic recording scheme as shown in FIGS. 2 and 3, the boundary of each flux reversal generates a voltage peak during read back. In the present system of recording, as well as in most systems of recording, the voltage peak contains a bit of information, therefore, the timing for each track must be adjusted accordingly. If the recording of information in a given track occurs in phase with a clock pulse labeled A' 28, then due to the inherent delay in response of the electromagnetic transducer in addition to the above-mentioned delays a new clock pulse 70 must be generated in phase with the read back of the flux reversal on a given track. This new clock pulse 70 will hereinafter be labeled A* and will be all in characteristics identical to that of a clock pulse A' 28 except that it is spaced a predetermined amount of time from the corresponding A' pulse. This predetermined amount of time is different for each track and as a general rule will be the less for the tracks nearest the center of the disk. In a like manner, each A* pulse generates a fourth series of pulses 72 labeled B* which are interposed midway in the space between adjacent A* pulses. The purpose of A* 70 and B* 72 pulses is to correctly interrogate the information on its associated information track. However, since the timing track 66 which generates the A' 28 and the B' 30 pulses is the basic timing track or clock for the entire data processing system, the information from each track must be synchronized after read back with the timing track.

Referring to FIG. 7, there is shown one embodiment of a system which may be used to read back the information recorded on the magnetic recording medium 20 by the system of FIG. 4. FIG. 8 is a timing diagram which will be used in conjunction with FIG. 7 explaining the several elements of the system of FIG. 7. In FIG. 8A there are shown two identical waveshapes 74 and 76 which are spaced apart a predetermined distance of time. As hereinbefore stated, the waveshapes are drawn as sawtooth waveshapes for ease of representation, however, it is to be understood that they are generally frequency modulated waves.

The reproducing or read back system of FIG. 7 comprises the recording medium or magnetic disk 20 upon which the recorded information is stored. Associated therewith and magnetically coupled, thereto is an electromagnetic transducer 34 which is responsive to the flux reversals of the magnetically encoded information on the disk. The output waveshape 74, of the transducer 34, is connected to the positive input 78 of a differential amplifier 80. The transducer is also connected through a delay line 82 to the negative input 84 of the differential amplifier. The output of the amplifier 80 is connected to three separate components, namely, a first AND-gate 86, the J input 88 of the JK flip-flop 90 and to the input of an inverting amplifier 92, the output of which is connected to the K input 94 of the JK flip-flop 90. The output of the inverter 92 is also connected to one input of a second AND-gate 96. The true or one output of the flip-flop 90 is connected to the second input of the first AND-gate 86 and the false or zero output of the flip-flop is connected to a second input of the second AND-gate 96. The outputs of both AND-gates 86 and 96 are then combined in an OR-gate 98 and supplied to a second JK flip-flop 100. The output of the OR-gate 98 is connected directly to the one input of the second JK flip-flop 100 and is also connected to the input of an inverting amplifier 102 whose output is connected to the zero input of the second JK flip-flop 100. The output of the second flip-flop is directly coupled to the input of a third flip-flop 104 for synchronizing the information from the recording medium 20 with the basic clock-timing signal 30.

A pulse generator 24 is operatively connected to the recording medium for the generation of the several clock pulses 30, 70 and 72 necessary for this system. In particular, the pulse generator 24 responds to the particular information track being sensed to generate the A* pulse 70 and also the pulse generator is responsive to the timing track to generate the A' pulse 28. From these two pulses, the pulse generator generates the second and fourth series of pulses, namely the B' 30 and the B* 72 pulses.

Referring to FIG. 7, the letters of reference correspond to the several waveshapes of FIG. 8. The transducer responds to the flux reversals on the magnetic disk 20 and generates the voltage waveform 74 shown in FIG. 8A. As previously mentioned, this is a frequency modulated voltage waveform which is applied to the positive input of the differential amplifier 80. This waveform is also applied to a delay means which delays the signal by a time equal to T/2. The time T is equal to the pulse period of the basic timing signal A' 28. The output 76 of the delay means 82 is supplied to the negative input of the differential amplifier 80.

The differential amplifier functions as a comparator 80 to compare the voltage amplitude of the pulses supplied at its input. Whenever the voltage at the positive input is more positive than the voltage at the negative input, the output of the amplifier, as shown in FIG. 8B, is a positive level signal. As hereinbefore indicated, the output of the comparator is connected to one input of the first AND-gate 86, the input of an inverting amplifier 92, and to the J input 94 of the first binary storage means or JK flip-flop 90. Since the output of the differential amplifier is a constant voltage level representing the amplitude difference between a transducer signal 74 and a delay transducer signal 76, the flip-flop is responsive to the A* pulses 70 from the pulse generator 24. Whenever a pulse from the pulse generator 24 occurs at the trigger input of the flip-flop, the flip-flop will respond and store a binary value representation of the output signal of the comparator 80. FIG. 8D illustrates the one output of the flip-flop 90 in response to the A* pulses 70 of FIG. 8C. It is to be understood that the zero output of the flip-flop is exactly opposite of the one output.

The one output of the flip-flop 90 is connected to the second input of the first AND-gate 86 wherein it is combined with the output of the comparator 80. Whenever the voltage polarities of the comparator and the flip-flop output are equal and positive, the output of the first AND-gate 86 is positive as shown in FIG. 8E. Whenever the input signals are unequal or both negative, the output of the AND-gate 86 is negative.

The zero output of the flip-flop 90 is connected to one input of the second AND-gate 96 and the output of the inverter 92 is connected to the second input of the second AND gate. In this AND gate, the negative value signal from the comparator is compared with the zero binary value signal of the flip-flop 90 and whenever both signals are positive, the positive output such as shown in FIG. 8F is supplied from this AND-gate 96 to one input of the OR-gate 98.

As described in conjunction with FIGS. 4 and 5, the data information is recorded on the disk, it is recorded according to the characteristics of the next-bit of information. In other words, in recording the system "looks ahead" from the present bit being recorded to the next adjacent bit to be recorded. Therefore, when reading back the information from the disk a comparison can be made between the present sampling time and the next sampling time. Thus, the delay means 82 delays the transducer signal which is being read, a sufficient period of time so that in conjunction with the first binary storage means 90 a comparison can be made between the two sampling times. This comparison is made in the first 86 and second 96 AND gates, the output of which is combined together and stored into a next storage means 100.

This system while it is particularly advantageous to use with the next-bit dependent method of recording, may be used with any scheme of magnetic recording. The sampling times in the preferred embodiment are functions of the time T although this is not to be understood as a limitation.

The second binary storage means 100 is responsive to the B* pulses 72 and basically stores the results of the comparison made in the first 86 and second 96 AND gates. When the output of the OR-gate 98 is positive and coincident with the B* pulse 72, the second binary storage means 100 is switched to having its true or one output positive, this is shown in FIG. 8H. In a similar manner as described with the first binary storage means, the output of the OR-gate 98 is also electrically connected to an inverting amplifier 102 whose output is connected to the zero input of the second binary storage means. Thus, the second binary storage means 100 stores the compared output of the first binary storage means 90 with the output of the differential amplifier or comparator 80.

In FIG. 7 there is shown an additional flip-flop 104 which is the final stage for synchronizing the information from the magnetic storage medium 20 into the data processing system. This flip-flop 104 is responsive to the B' pulses 30 from the pulse generator 24 and is directly responsive to the binary outputs of the second binary storage member 100. The output of this third flip-flop 104 is shown in FIG. 8K which shows the response of the flip-flop to the pulses of FIG. 8H with the timing pulses of FIG. 8J.

Analyzing waveform of FIG. 8K with the pulse pattern of FIG. 8J, the binary value of the signal of FIG. 8A can be decoded. The time between adjacent pulses of FIG. 8J is equivalent to one data cell of information hereinbefore referred to as T, therefore, starting with the first pulse in FIG. 8J, the interrogation of FIG. 8K yields 0011010. Comparing this waveform back to the waveform of FIG. 5C, and starting with the second zero of FIG. 8K, the waveforms are identical.

Figures 10, 10A, 10B, 10C, 10D, 10E, 10F, 10G, 10H:
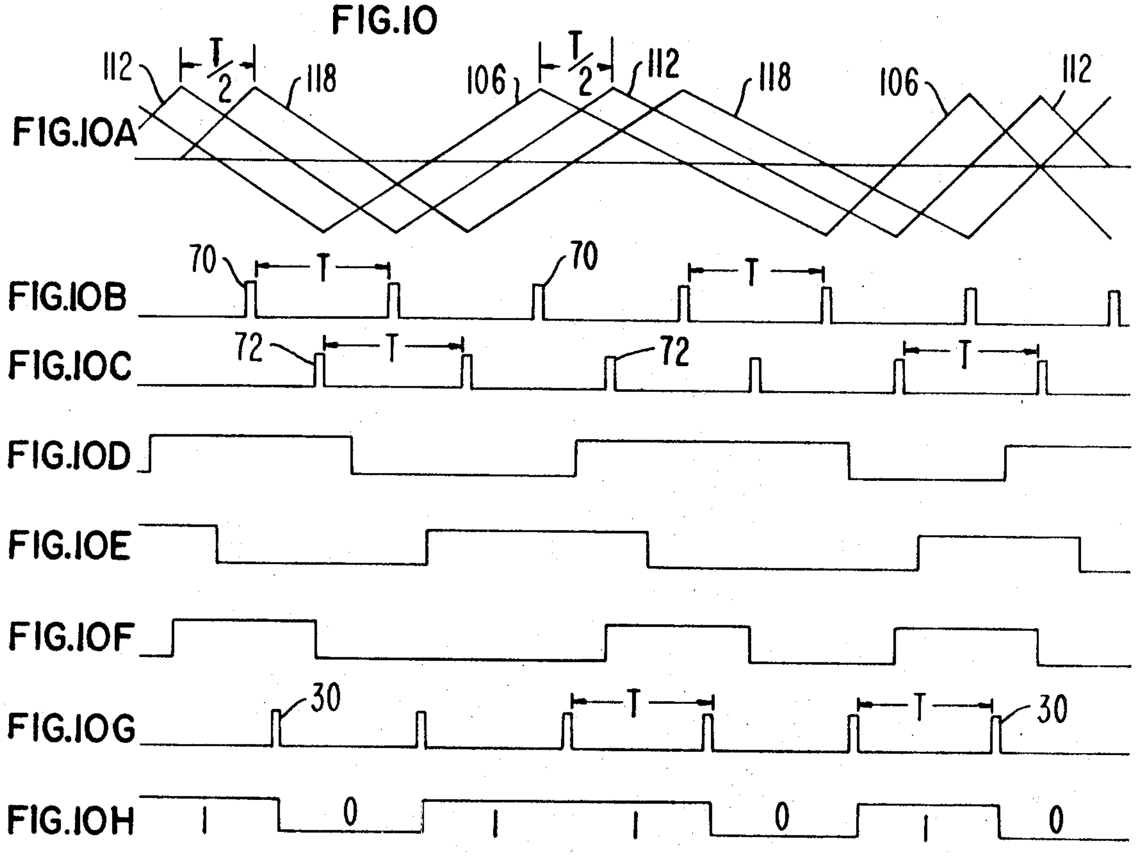
FIG. 10A–10H are waveforms illustrations taken at corresponding lettered portion in FIG. 9.

In the corresponding diagram in FIG. 9, there is shown another embodiment for recovering or reproducing the information encoded on the magnetic recording medium 20. As in FIGS. 7 and 8, the correlation between the waveshapes shown in FIG. 10 with the circuitry of FIG. 9 is the same. As an example, FIG. 10D is the waveshape at point D of FIG. 9.

The transducing means 34 is electromagnetic transducer which is operatively coupled to the magnetically recording medium 20. The transducer responds to the flux reversals on the recording medium and generates the voltage waveform 106 shown in FIG. 10A. As previously mentioned, this frequency modulated voltage waveform 106 which is applied to the OR input of a first comparator 108 and to the input of a first delay means 110. The output 112 of the first delay means 110 which delays the input signal by the time equal to T/2, is applied to the positive inputs of the first 108 and second 114 comparator and to the input of the second delay means 116. The second delay means 116 delays the signal 112 by an additional time equal to T/2 and its output 118 is applied to the negative input of the second comparator means 114.

The first 108 and second 114 comparator means are differential amplifiers wherein the output of each amplifier is a positive voltage level when the signal at the positive input of the amplifier is more positive than the signal at the negative input of the amplifier. The output of the first comparator means 108 is shown in FIG. 10D and the output of the second comparator means 114 is shown in FIG. 10E. The outputs from both comparators are supplied to a control means 120 including a binary storage element 122 which is responsive to the B* pulse 72 from the pulse generator 24. The function of the control means 120 is to compare the polarities of the signals from each comparator 108 and 114 and to store the results of this comparison in response to the B* pulse 72.

The positive output in the first comparator means 108 and the positive output from the second comparator means 114 are combined together in a first AND-gate 124 and the negative outputs from each of the comparator means are compared together in a second AND-gate 126. Since the embodiment shown in FIG. 9 is working with positive voltage levels, the negative inputs from both comparators 108 and 114 are first inverted 128 and 130 before being applied to the second AND-gate 126. The result of the two AND gates which individually produced positive pulses whenever both inputs are positive, are combined together in an OR-circuit 132 and supplied to the zero input of the storage means 122. Whenever the output of the OR-gate 132 is negative, the signal is inverted and supplied to the input of the one input side of the flip-flop 122. Thus, the binary storage means 122 supplies or generates a binary zero output whenever the outputs of the two comparators are equal. An additional JK flip-flop 134 responsive to the B' pulse 30 of the data information system further synchronizes the information from a particular track on the magnetic disk 20 with the data information system.

Analyzing the waveform of FIG. 10F, the pulse pattern of FIG. 10G, the signal of FIG. 10A can be decoded. As in FIGS. 8J, the time between the pulses of FIG. 10G are equal or equivalent to one data cell of information, therefore, starting with the first pulse in FIG. 10G, the interrogation of FIG. 10A is 1011010 which is identical to the interrogation of FIG. 8K. Comparing this waveform back to the waveform of FIG. 5C and starting with the first zero of FIG. 10H, the waveforms are identical.

As previously mentioned, when the information is recorded on the disk according to the characteristics of the next-bit dependent information recording system, the reproducing system functions to delay in some manner and by some means, the information from the disk for complete interrogation. FIGS. 7 and 9 shown only two embodiments which may be used to reproduce the information from the disk. Another embodiment may utilize the storage characteristics of capacitors which are selectively charged according to the signal from the transducer. The charging and discharging times of the capacitors are coincident with consecutive pulse times of the A* and B* pulses. The outputs of the capacitors representing the charges thereon are then compared in comparators and interrogated and clocked into the system and in response the A' and B' pulses.

There has been shown and described the next-bit dependent method of recording and reproducing information from a recording medium such as a magnetic disk. The method comprises the steps of encoding the information to be recorded into digital binary value bit serial pulse form. Such information may come from a keyboard on an accounting machine, from a magnetic tape storage unit or any other manner of input data form. A sampling signal or first series of pulses, is generated which is equivalent to the main clocking or control signals of the data information system. From this sampling signal a second series of pulses are interposed in the space between adjacent signals of said first series of pulses. The combination of these two series of pulses result in a signal having twice the frequency of the rate of which the information is to be recorded. At every even numbered sampling signal or as previously indicated, every A′ pulse, the encoded information signal is sampled and if the binary value of the bit to be recorded is a binary zero then a recording signal is generated. At every odd-numbered-sampling signal or as previously indicated, every B′ pulse, the encoded information is again sampled. At this sampling time, both the present bit of information to be recorded and the next bit of information to be recorded are sampled and if there are adjacent binary one bits to be recorded, a second recording signal is generated. These two signals are then combined and applied to a transducer for digitally recording on the recording medium the information which has been encoded previously.

Restating the above method in the form of a set of rules, the following recording rules are generated:

1. For binary zero valued signal to be recorded a recording signal or flux change is generated at every A′ clock pulse.
2. If the information to be recorded is a binary one value, a recording signal is generated at the B′ pulse if the next bit to be recorded is also a one.
3. The present bit to be recorded is a binary one and the next bit is a binary zero, there is no recording signal generated at either the A′ or the B′ pulse for that data cell.

Thus, it has been shown and described a look-ahead method of recording data information on a recording medium such as a magnetic disk. When such a system is used, the density of information recording is at an optimum in terms of flux or information reversals on the recording medium.

What is claimed is:

1. A system for processing information for optimum information storage density on a recording medium comprising:
  pulse generator means to generate a first series and a second series of pulses wherein the intervals between the adjacent pulses in each series of pulses are equal and said intervals are representative of the minimum spacing between successive information representations on a recording medium, the pulses of said second series of pulses being interposed in the interval between adjacent pulses of said first series of said pulses,
  register means responsive to said second series of pulses to receive binary coded information in bit serial pulse form,
  delay means electrically coupled to said register means and responsive to one of said second series of pulses to receive a binary coded information bit pulse from said register means, said delay means having a binary one and a binary zero output,
  first control means responsive to the binary zero output of said delay means and each of said first series of pulses to generate a first coded signal, representing binary zero information in said register means, and
  second control means responsive to a binary one bit information signal from said register means, the binary one output from said delay means and the next succeeding pulse of said second series of pulses, to generate a second coded signal representing successive binary one information in said register means.

2. In an information storage system, an information-processing system comprising:
  register means for receiving binary valued information signals in serial order,
  pulse generating means for generating a plurality of first pulses having a pulse repetition rate equal to T and a plurality of second pulses having a pulse repetition rate equal to T, each of said second pulses interposed in the space between adjacent first pulses,
  binary storage means having a binary one and a binary zero output, said storage means operatively coupled to said register means to receive the information signals therefrom and responsive to one of said second pulses from said pulse-generating means to temporarily store each information signal therein according to its binary encoded value,
  first logical gating means responsive to the electrical signals from said register means, to the next succeeding pulse of said second pulses from said pulse-generating means and to the binary one output from said binary storage means to generate a first signal in response thereto for successive binary one value information signals from said register means, and
  second logical gating means response to each of said first pulses from said pulse-generating means and to the binary zero value output from said binary storage means to generate a second signal in response thereto for a binary zero value information signal from said register means,
  a transducer responsive to said first and second signals and operable to generate a first magnetic recording signal in response to said first signal and to generate a second magnetic recording signal in response to said second signal, and
  a magnetic storage member having a plurality of individually magnetizable storage elements each element successively coupled to said transducer and responsive to said recording signals to be magnetically oriented in one state in response to said first magnetic recording signal and magnetically oriented in the opposite state in response to said second magnetic recording signal.

3. In an information storage system, an information-processing system according to claim 2 wherein said second pulses from said pulse-generating means are interposed midway in the space between adjacent first pulses.

4. In an information storage system, an information-processing system according to claim 2 wherein said transducer additionally includes a bistable switching member responsive to each of said first and second recording pulses and operable to switch said transducer from one magnetic state to the opposite magnetic state.

5. The next-bit dependent method of recording binary information comprising the steps of:
  encoding the information to be recorded into binary valued bit serial pulse form,
  generating a sampling signal having a frequency equal to twice the recording bit frequency,
  sampling at every odd-numbered-sampling signal the binary zero bit value of the information to be recorded recorded,
  generating a first signal in response to each binary zero bit at said odd-numbered-sampling signal,
  comparing at every even-numbered-sampling signal the binary one bit value of the information being recorded and the binary one bit value of the next bit of information to be recorded,
  generating a second signal in response to the first of two adjacent binary one bits of information at said even-numbered-sampling numbered signal, and
  recording the binary information in response to said first and second signals.

6. A system for processing information for optimum information storage density on a recording medium comprising:
  a recording medium having a plurality of adjacent information representations storage elements, each element storing a binary valued bit of information,
  transducing means operatively coupled successively to each information storage element responsive thereto to generate a modulated electrical signal according to the information represented by said element,
  pulse-generating means responsive to said recording medium and operative to generate a series of pulses wherein the interval between adjacent pulses is equal and representative of the minimum spacing between adjacent storage elements of said recording medium, first delay means responsive to said transducing means and operable to generate a first delayed modulated signal, second delay means responsive to delayed modulated signal from said first delay means and operable to generate a second delayed modulated signal, first comparator means responsive to said first delayed modulated signal and said modulated signal to generate a positive voltage signal when said first delayed modulated signal is more positive than said modulated signal, second comparator means responsive to said first and second delayed modulated signals and operative to generate a positive voltage signal when said first delay-modulated signal is more positive than the second delayed modulated signal, and control means operatively coupled to said first and second comparator means and responsive to said pulse generative means to generate a binary zero information signal when the output of said first and second comparator means are equal.

7. A system for processing information for optimum information storage density on a recording medium comprising:

a recording medium having a plurality of adjacent magnetically encoded information storage elements, each element storing a binary valued bit of information, transducing means magnetically coupled successively to each of said storage element and responsive to the magnetic state of the said storage element to generate a modulated electrical signal, first pulse-generating means responsive to said recording medium and operable to generate a first and second series of pulses wherein the intervals between adjacent pulses in each series of pulses are equal and said intervals are representative of the minimum spacing between said storage elements on said recording medium, the pulses of said second series of pulses being interposed in the intervals between adjacent pulses of said first series of pulses, delay means operatively coupled to said transducer means and operative to generate a delayed modulated signal therefrom, comparator means responsive to said transducer means and said delay means and operable to generate a positive voltage signal when said modulated signal is more positive than said delayed modulated signal, first binary storage means responsive to said first series of pulses and operable to store the output signal of said comparator means, second binary storage means responsive to said second series of pulses and operable to store the output signal of said first binary storage means, second pulse-generating means responsive to said recording medium and operable to generate a third series of pulses having an interval between adjacent pulses equal to the interval of said first and second series of pulses, and control means responsive to said third series of pulses and operable to generate a binary one information signal when the outputs of said first and second binary storage means are unequal and operable to generate a binary zero signal when the output of said first and second storage means are equal.

8. In an information storage system, an information-processing system comprising:

storage means for magnetically storing information in either of two magnetic states, transducing means magnetically coupled to said storage means for generating a modulated electrical signal in response to the magnetic state of the information on said storage means, a first delay operatively connected to said transducing means and responsive to the electrical signals therefrom to generate a first delayed electrical signal substantially identical to said electrical signal, a second delay operatively connected to said first delay and responsive to said first delayed electrical signal to generate a second delayed signal substantially identical to said electrical signal, a first comparator operatively coupled to said first delay to generate a signal when said first delayed electrical signal has a voltage magnitude more positive than said electrical signal, a second comparator operatively coupled to said second delay to generate a signal when said first delayed signal is more positive than said second delayed signal, pulse-generating means responsive to said storage means to generate an electrical timing signal, and decoding means operatively coupled to said first and second comparator and responsive to said electrical timing signal to generate a binary one information signal when the signals from said first and second comparator are equal and to generate a binary zero information signal when said signals are unequal.

* * * * *